United States Patent
Sawada

(10) Patent No.: US 8,274,528 B2
(45) Date of Patent: Sep. 25, 2012

(54) SUPPORT SYSTEM, METHOD AND PROGRAM

(75) Inventor: Ryusaku Sawada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1118 days.

(21) Appl. No.: 12/167,484

(22) Filed: Jul. 3, 2008

(65) Prior Publication Data
US 2009/0012758 A1   Jan. 8, 2009

(30) Foreign Application Priority Data
Jul. 6, 2007 (JP) .................................. 2007-178084

(51) Int. Cl.
*G09G 5/00* (2006.01)
(52) U.S. Cl. ........ 345/619; 345/418; 345/419; 345/420; 345/581; 345/629
(58) Field of Classification Search ........................ None
See application file for complete search history.

(56) References Cited

U.S. PATENT DOCUMENTS
| | | | | |
|---|---|---|---|---|
| 5,819,070 A | * | 10/1998 | Sasaki ............................... | 703/13 |
| 2006/0005613 A1 | * | 1/2006 | Kuwajima et al. ............... | 73/104 |
| 2007/0079190 A1 | * | 4/2007 | Hillman et al. ................... | 714/724 |

FOREIGN PATENT DOCUMENTS
| | | |
|---|---|---|
| JP | 2003-114121 | 4/2003 |
| JP | 2005-208735 | 8/2005 |
| JP | 2005-266894 | 9/2005 |
| JP | 2005266894 A * | 9/2005 |

OTHER PUBLICATIONS

Paolo Sabella, "A rendering Algorithm for Visualizing 3D Scalar Fields", Computer Graphics, XP-002498631, vol. 22, No. 4, Aug. 1988, pp. 51-58.

Rik Stokking, et al., "Display of Fused Images: Methods, Interpretation, and Diagnostic Improvements", Seminars in Nuclear Medicine, XP005154371, vol. XXXIII, No. 3, Jul. 2003, pp. 219-227.

K. Koyamada, et al., "Volume visualization of 3D finite element method results", IBM Journal of Research and Development, XP000262735, vol. 35, No. 1/2, Jan./Mar. 1991, pp. 12-25.

(Continued)

*Primary Examiner* — Kee M Tung
*Assistant Examiner* — Jwalant Amin
(74) *Attorney, Agent, or Firm* — Oblon, Spivak, McClelland, Maier & Neustadt, L.L.P.

(57) ABSTRACT

A design support system includes an input unit for receiving shape data indicative of mutually different first and second shapes, finite element model data indicative of a finite element model for each shape, and attribute data indicative of an attribute at each node of the finite element model, a shape display unit for displaying the shapes on a screen, a superimposing unit for superimposing the shapes displayed on the screen, on each other, based on a reference site, an attribute calculating unit for calculating the attributes at attribute calculation points set at predetermined positions on the screen, based on the attributes of the nodes, with respect to each of the superimposed shapes, and an attribute difference calculating unit for calculating differences in the attributes of the nodes and the attribute calculation points of the respective shapes.

19 Claims, 7 Drawing Sheets

OTHER PUBLICATIONS

Thomas A. Foley, et al., "Visualization of Irregular Multivariate Data", IEEE, Proceedings of the Conference on Visualization, XP010021084, vol. 1, Oct. 23, 1990, pp. 247-254.

S. Moini, "Application of visualization tools in solid mechanics", IBM Journal of Research and Development, XP000262746, vol. 35, No. 1/2, Jan./Mar. 1991, pp. 156-166.

T. Schmidt, et al., "On-line Visualization of Arbitrary Unstructured, Adaptive Grids", Proceedings of the Eurographics Workshop on Visualization in Scientific Computing, XP009106305, May 3-5, 1995, 12 pages.

* cited by examiner

F I G . 6
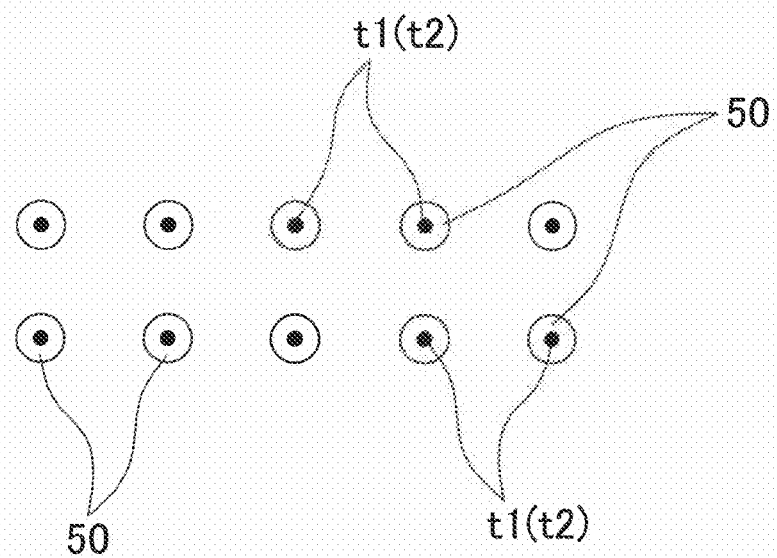
F I G . 7
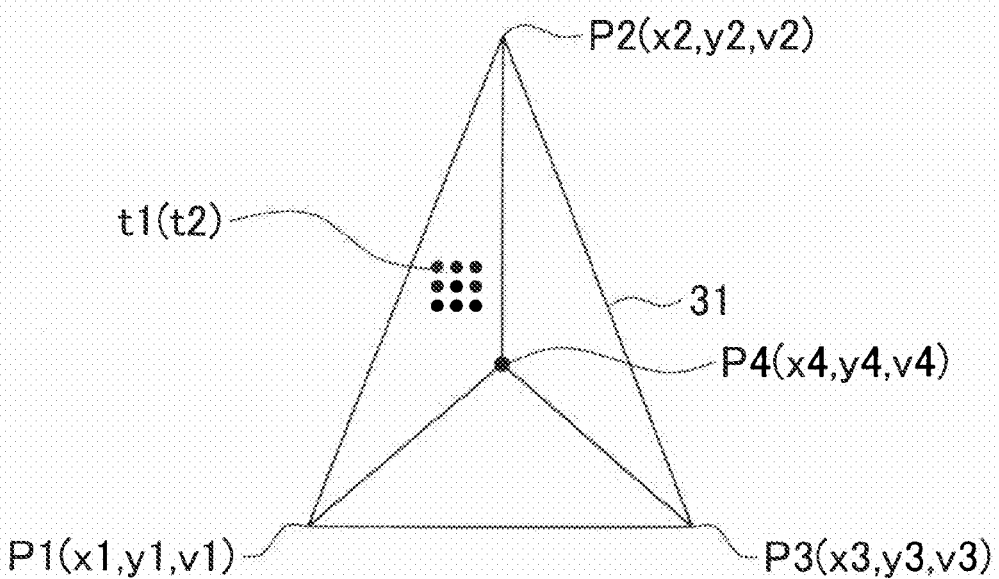

SUPPORT SYSTEM, METHOD AND PROGRAM

INCORPORATION BY REFERENCE

The disclosure of Japanese Patent Application No. 2007-178084 filed on Jul. 6, 2007, including the specification, drawings and abstract, is incorporated herein by reference in its entirety.

BACKGROUND OF THE INVENTION

1. Field of the Invention

The invention relates to design support system, method and program, and more particularly to a design support technique for calculating and displaying differences in an attribute between different shapes.

2. Description of the Related Art

Techniques for calculating a difference in shape between different shapes are disclosed in, for example, Japanese Patent Application Publication No. 2005-266894 (JP-A-2005-266894) and Japanese Patent Application Publication No. 2005-208735 (JP-A-2005-208735). For example, a gear shape simulation method disclosed in JP-A-2005-208735 includes the steps of: obtaining a finite element model representing the shape of a toothed gear that has been subjected to heat treatment, positioning the finite element model for the gear shape after heat treatment and a finite element model representing the shape of a standard gear relative to each other, with respect to the centers of gravity thereof, so as to calculate a difference in shape between these gears.

A mold design support method disclosed in JP-A-2005-266894 includes the steps of: superimposing a finite element model of a product of plastic working and a finite element model of a standard product of plastic working on each other, at at least two nodes thereof, and comparing these models with each other while fixing the nodes, so as to calculate a difference in shape between the products. Also, in the related art other than the above-identified publications JP-A-2005-266894 and JP-A-2005-208735, there is disclosed a technique for displaying differences between the same two shapes, in terms of attributes, such as distortion, stress and temperature, set at respective nodes of a finite element model of each shape.

However, according to the techniques as disclosed in JP-A-2005-266894 and JP-A-2005-208735, differences in attributes, such as distortion, stress and temperature, at the nodes and other positions than the nodes between different shapes cannot be calculated. With the above-described technique for displaying differences in attributes at respective nodes between the same shapes, the differences in the attributes at the nodes can be calculated and displayed, but differences in the attributes at points other than the nodes cannot be calculated and displayed.

SUMMARY OF THE INVENTION

The present invention provides a design support technique for calculating differences in attributes at nodes and other positions than the nodes, between different shapes, and displaying the calculated attribute differences while distinguishing them from one another depending on the values of the differences.

A design support system according to a first aspect of the invention includes (a) input means for receiving shape data indicative of at least two, mutually different shapes, finite element model data indicative of a finite element model for each of the above-indicated at least two shapes, and attribute data indicative of an attribute at each node of the finite element model, (b) shape display means for displaying the above-indicated at least two shapes on a screen, (c) superimposing means for superimposing the above-indicated at least two shapes displayed on the screen by the shape display means, on each other, with reference to a site designated by information received by the superimposing means, or a predetermined site, (d) attribute calculating means for calculating the attribute at an attribute calculation point set at a predetermined position on the screen, based on the attribute of each node, with respect to each of the above-indicated at least two shapes superimposed on each other, and (e) attribute difference calculating means for calculating differences in the attribute between the above-indicated at least two shapes, at the nodes and the attribute calculation points.

According to the first aspect of the invention, at least two, mutually different shapes are displayed on the screen, and these shapes are superimposed on each other with reference to a site designated by the user, or a predetermined site. Then, the attributes of the attribute calculation points located at predetermined positions on the screen are calculated based on the attributes of the nodes, with respect to the finite element model of each shape, and differences in the attributes between the shapes are calculated at the nodes and the attribute calculation points other than the nodes. In this manner, the attribute differences between different shapes can be calculated at the nodes and the attribute calculation points other than the nodes.

The above-indicated at least two shapes may be in two-dimensional form. Also, the screen of the shape display means may consist of a plurality of pixels, and the nodes and the attribute calculation points may be located at positions corresponding to the pixels. Also, the design support system may further include attribute difference displaying means for displaying the differences in the attribute at the nodes and the attribute calculation points. In this case, the differences in the attribute may be displayed, using isopleths, a graph, or graphics. Furthermore, the differences in the attribute may be calculated by interpolation or finding of equivalent points.

A second aspect of the invention relates to a method according to which a computer, or other device, machine, or the like, executes any of the operations or processes as described above. A third aspect of the invention relates to a program recorded on a computer-readable storage medium, which program causes a computer, or other device, machine, or the like, to implement any of the functions as described above.

In this connection, the computer-readable storage medium means a storage medium in which information, such as data and programs, are electrically, magnetically, optically, mechanically, or chemically stored, and from which the computer can read the information.

Examples of the storage medium, which can be removed from the computer, include, for example, a flexible disk, magneto-optical disk, CD-ROM, CD-R/W, DVD, DAT, 8 mm tape, memory card, and so forth. Examples of the storage medium, which are fixed in the computer, include, for example, a hard disk, ROM (Read Only Memory), and so forth.

According to the invention, attribute differences at nodes and attribute calculation points other than the nodes between different shapes can be easily calculated. Also, the attribute differences are displayed on the screen while being distinguished from one another, so that the condition of the distribution of the attribute differences can be easily determined or recognized.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIG. 6 is a view showing the positional relationship between pixels and the attribute calculation points according to the embodiment of the invention;

FIG. 7 is a view useful for explaining a method of calculating the attributes of the attribute calculation points by interpolation, according to the embodiment of the invention;

DETAILED DESCRIPTION OF EMBODIMENTS

In the following, design support system, method and program according to the best mode (which will be called "embodiment") for implementing the present invention will be described with reference to the drawings. It is to be understood that the configuration of the embodiment below is illustrated by way of example, and that the invention is not limited to the configuration of the embodiment.

Figure 1:
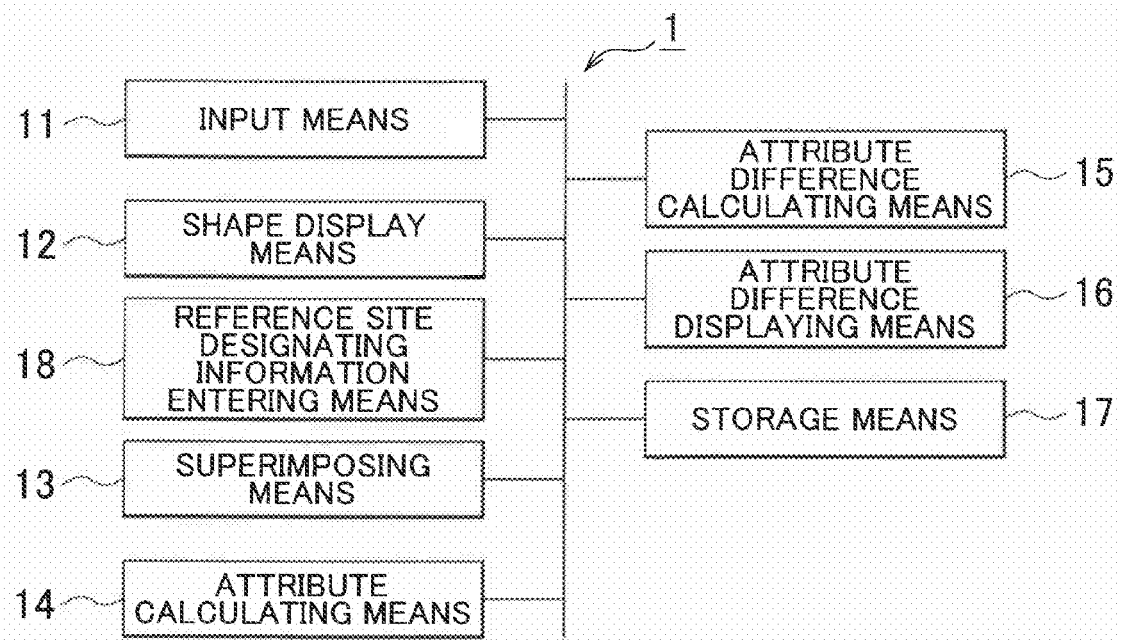
FIG. 1 is a view showing the configuration of a design support system according to one embodiment of the invention.

FIG. 1 illustrates a design support system 1 according to one embodiment of the invention. The design support system 1 includes an input means 11 for receiving shape data indicative of at least two, mutually different shapes, finite-element-model data indicative of a finite element model of each shape, and attribute data indicative of attributes set at nodes of an element, e.g., a triangular element in this embodiment, of the finite element model, and a shape display means 12 for displaying the two shapes on a screen. The design support system 1 further includes a reference site designating information entering means 18 for entering designating information that designates, on the screen, a reference site based on which the two shapes displayed on the screen are superimposed on each other, a superimposing means 13 for superimposing at least two shapes based on the reference site designated by the designating information, or based on a predetermined reference site. The design support system 1 further includes an attribute calculating means 14 for calculating the attributes of attribute calculation points that are set at predetermined positions on the screen, an attribute difference calculating means 15 for calculating differences in the attributes at the nodes and attribute calculation points between the two shapes, an attribute difference display means 16 for displaying the differences in the attributes, and a storage means 17 for storing the attributes calculated by the attribute calculating means 14, and other information.

Figure 2:
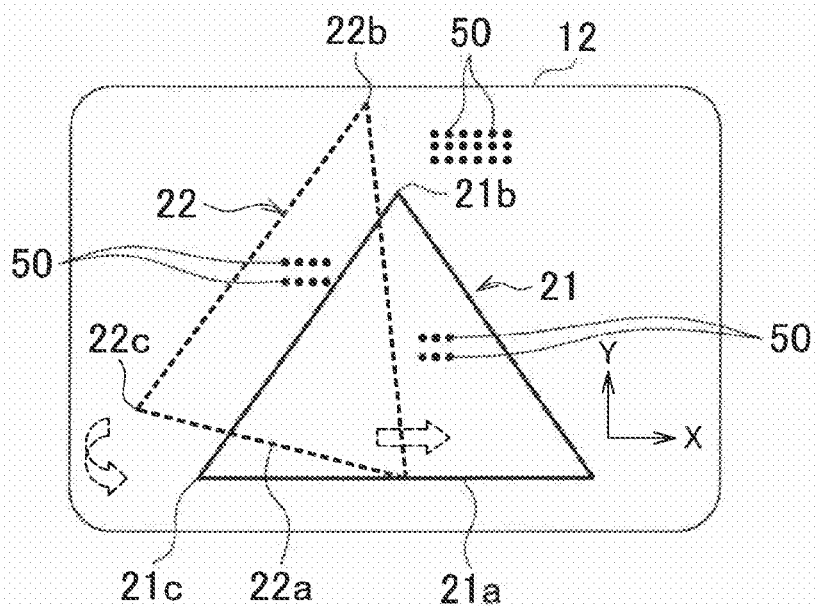
FIG. 2 is a view showing a condition before a first shape and a second shape are superimposed on each other on a screen, according to the embodiment of the invention.

Next, each of the components of the design support system 1 will be explained. As shown in FIG. 2, the input means 11 receives shape data indicative of at least two, mutually different shapes, namely, a first shape 21 of an equilateral triangle and a second shape 22 of an isosceles triangle in this embodiment. The input means 11 also receives finite-element-model data indicative of finite element models for the first shape 21 and the second shape 22, and attribute data indicative of attributes set at the nodes of each element of each finite element model. Examples of the attributes include distortion, stress, temperature, and so forth.

The finite element models of at least two, mutually different shapes are in two-dimensional form. In the case where the system handles a product, such as an engine part, having a three-dimensional shape, a portion of the finite element model for the three-dimensional shape, for which attribute differences are to be calculated, is transferred onto a plane orthogonal to the direction of the normal, for example, to provide a finite element model of a two-dimensional shape. When the finite element model of the two-dimensional shape is created, elements on planes that are inclined relative to or are orthogonal to the plane (orthogonal to the normal), in the finite element model of the three-dimensional shape, are eliminated or lost. For example, where two or more elements are present on a plane orthogonal to the above-indicated plane, in the finite element model of the three-dimensional shape, these elements form a straight line when the model is converted to that of two-dimensional shape, and the nodes of the two or more elements in the finite element model of the three-dimensional shape lie on the straight line.

In this case, the nodes that lie on the above-indicated straight line may be ignored, and the attributes at the nodes located at the opposite ends of the straight line may be used. Alternatively, the attributes at the nodes that lie on the straight line may be added to the attributes at the nodes of the opposite ends of the straight line, in a proportion that is inverse to the ratio of the distances between the nodes on the straight line and the nodes at the opposite ends of the line. Thus, the attributes may be set as desired.

Figure 3:
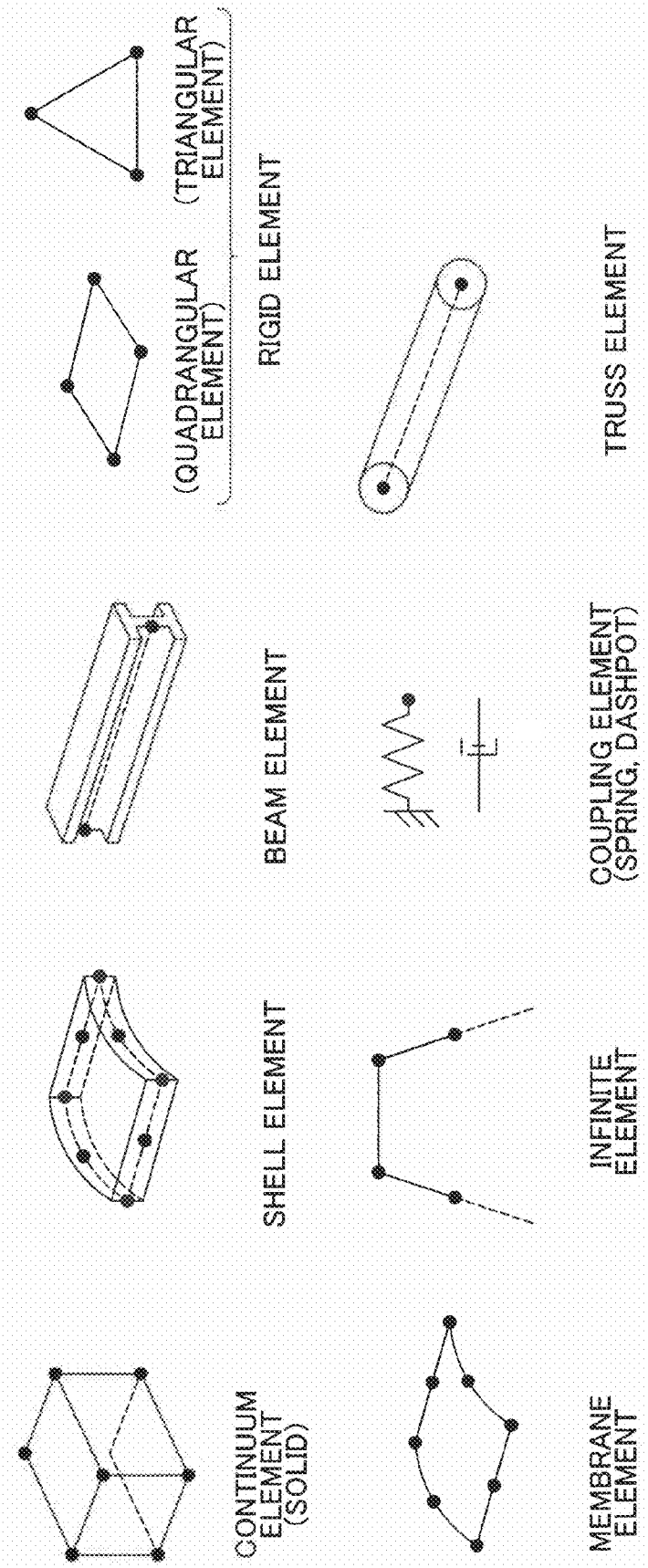
FIG. 3 is a view showing a generally known family of elements.

As elements of the finite element model, a family of elements generally used in stress analysis and temperature analysis is known. The family of elements is classified mainly based on geometric characteristics. The family of elements includes, for example, continuum element (solid), shell element, beam element, rigid element, membrane element, infinite element, coupling element (spring, dashpot), and truss element, as shown in FIG. 3. The rigid element includes, for example, a triangular element and a quadrangular element. In FIG. 3, black dots indicate the above-mentioned nodes. In the present invention, the rigid element is used. In this embodiment, the triangular element, as one type of the rigid element, is used. In the triangular element, the respective apexes provide the nodes.

The shape display means 12 displays the first shape 21 and the second shape 22 on the screen. In this embodiment, the first shape 21 is positioned such that its base 21a extends in the horizontal direction, and the second shape 22 is positioned such that its base 22a is inclined relative to the base 21a of the first shape 21, as shown in FIG. 2. The shape display means 12 consists of a multiplicity of pixels 50 that are arranged at equal intervals on an X-Y coordinate system.

Figure 4:
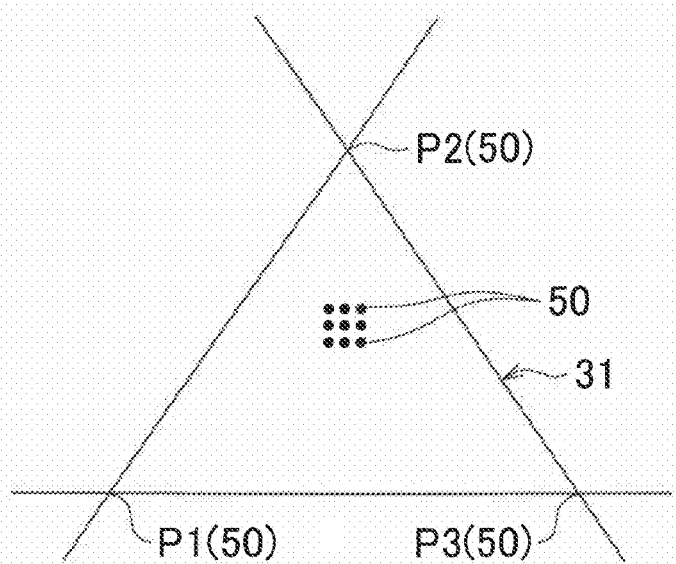
FIG. 4 is a view showing the relationship between nodes and attribute calculation points according to the embodiment of the invention.

As shown in FIG. 4, the number of the pixels 50 is tremendously larger than the number of the nodes P1, P2, P3 of the triangular element 31 in the finite element model for each of the first shape 21 and the second shape 22. Accordingly, the nodes P1, P2, P3 of the first shape 21 and second shape 22 are assumed to be placed on the pixels 50. Also, a large number of pixels 50 are placed between the nodes P1, P2, P3 and within each triangular element 31. A generally used display device, or the like, may be used as the shape display means 12.

The reference site designating information entering means 18 may be in the form of, for example, a pointing device, such as a mouse, or a keyboard. As shown in FIG. 2, the reference site designating information entering means 18 enters designating information that designates the bases 21a, 22a of the first shape 21 and second shape 22, and the apexes 21c, 22c at the lower, left side in FIG. 2, as reference sites, with mouse-clicks for example.

The superimposing means 13 superimposes the bases 21a, 22b and the apexes 21c, 22c designated as the reference sites based on the designating information, on each other, so as to superimpose the first shape 21 and the second shape 22 on each other, as shown in FIG. 2.

Figure 5:
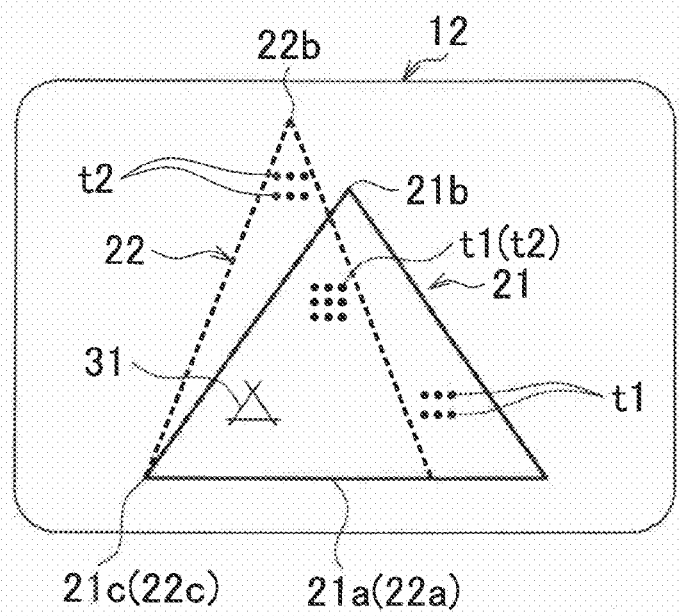
FIG. 5 is a view showing a condition in which the first shape and the second shape are superimposed on each other on the screen according to the embodiment of the invention.

In this case, the superimposing means 13 fixes, for example, the first shape 21, and rotates the second shape 22 in a counterclockwise direction in FIG. 2, so as to overlay the base 22a of the second shape 22 on the base 21a of the first shape 21. At the same time, the superimposing means 13 moves the second shape 22 to the right in FIG. 2, so that the apex 22c at the lower, left side of the second shape 22 coincides with the apex 21c at the lower, left side of the first shape 21, as shown in FIG. 5.

The superimposing means 13 may superimpose the first shape 21 and the second shape 22 on each other, with reference to a predetermined site, such as the center of gravity, as a reference site. In this case, a program causes the superimposing means 13 to calculate the center of gravity of the first shape 21 and that of the second shape 22, and the centers of gravity are superimposed on each other so that the first shape 21 and the second shape 22 can be automatically superimposed on each other. Thus, there is no need to operate a mouse, or the like, so as to enter designating information that designates a reference site or sites. Also, in this case, the reference site designating information entering means 18 need not be provided.

The attribute calculating means 14 calculates the attributes of the attribute calculation points t1 (first shape 21), t2 (second shape 22) set at predetermined positions on the screen of the shape display means 12, e.g., at positions corresponding to the pixels 50 in this embodiment, with respect to each of the first shape 21 and the second shape 22, as shown in FIG. 6. In a portion where the first shape 21 and the second shape 22 overlap each other (see FIG. 5), the attribute calculation points t1 of the first shape 21 and the corresponding attribute calculation points t2 of the second shape 22 lie on the same points, namely, lie on the same pixels 50.

In this embodiment, the attribute calculating means 14 calculates the attributes Va of all of the attribute calculation points t1, and the attributes Vb of all of the attribute calculation points t2, based on the attributes V1, V2, V3 of the nodes P1, P2, P3 of the triangular elements 31 in the finite element models of the first shape 21 and the second shape 22, as shown in FIG. 7. In a modified example, part of the attribute calculation points t1, t2 may be skipped, and the attributes Va, Vb of the remaining attribute calculation points t1, t2 may be calculated.

While various known techniques, such as interpolation or finding of equivalent points, are available as methods of calculating the attributes Va, Vb of the attribute calculation points t1, t2 based on the attributes V1, V2, V3 of the nodes P1, P2, P3, calculation of the attributes by interpolation will be explained herein by way of example.

Initially, the X and Y coordinates of the nodes (apexes) P1, P2, P3 of the triangular element 31 in the finite element model of the first shape 21 and the second shape 22 are represented by (x1, y1), (x2, y2), (x3, y3), respectively. The attributes of the nodes P1, P2, P3 are denoted by V1, V2, V3, respectively. Also, the attribute calculation points t1, t2 in the triangular element 31, at which the attributes are to be calculated, are represented by an attribute calculation point P4 for the sake of convenience. The X and Y coordinates of this attribute calculation point P4 are (x4, y4), and the attribute of this point is V4.

Figure 8:
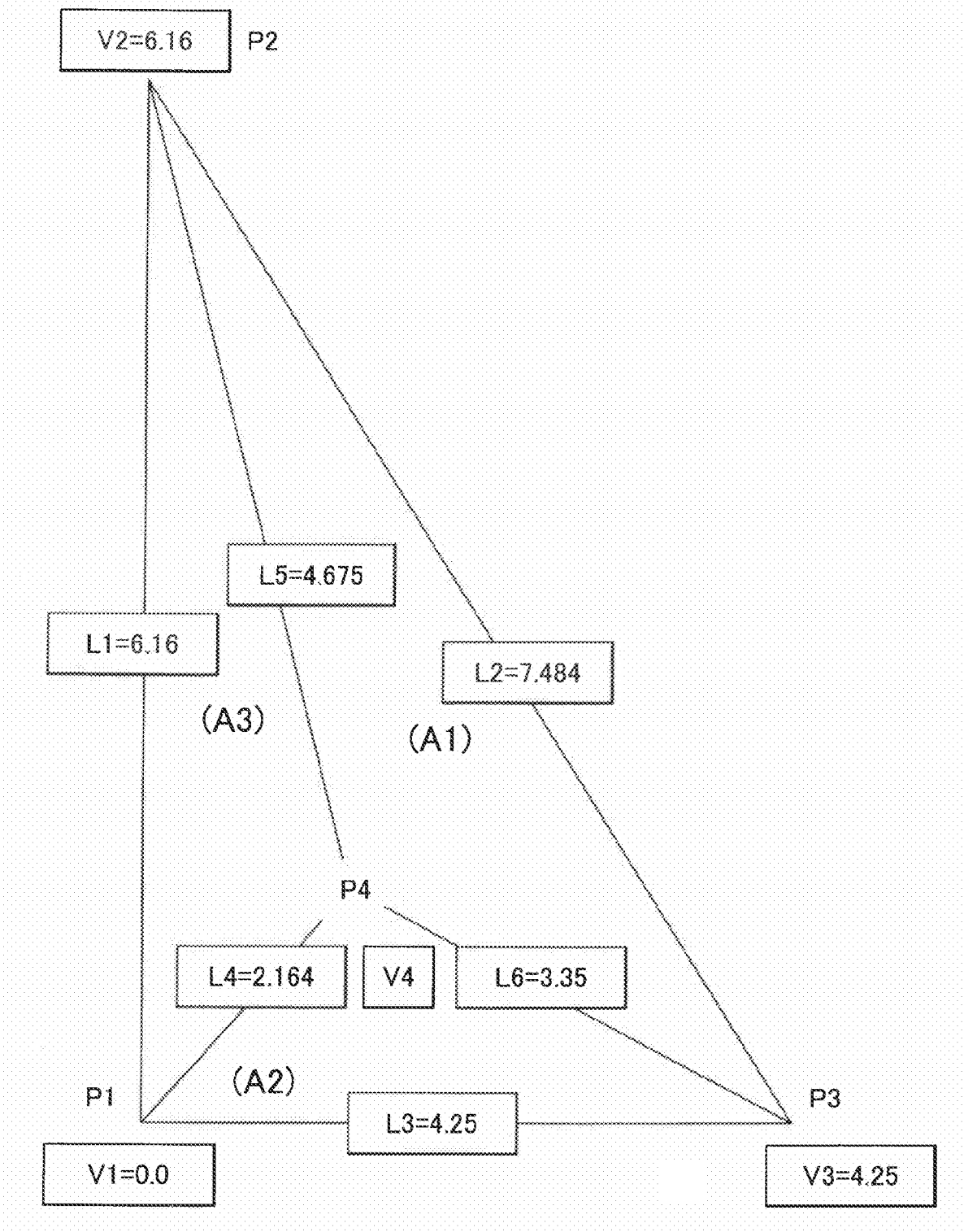
FIG. 8 is a view showing specific numeral values of respective parts for use in calculation of the attributes by interpolation according to the embodiment of the invention.

Referring to FIG. 8, L1 is a segment that connects the nodes P1 and P2, L2 is a segment that connects the nodes P2 and P3, L3 is a segment that connects the nodes P1 and P3, L4 is a segment that connects the attribute calculation point P4 and the node P1, L5 is a segment that connects the attribute calculation point P4 and the node P2, and L6 is a segment that connects the attribute calculation point P4 and the node P3. The lengths of the respective segments L1 through L6 may be calculated based on the X and Y coordinates of the nodes P1-P3 and the attribute calculation point P4.

Also, in FIG. 8, A1 is an area of a region defined by the segments L2, L5 and L6, A2 is an area of a region defined by the segments L3, L4 and L6, A3 is an area of a region defined by the segments L1, L4 and L5, and A is the entire area of the triangular element 31. The areas A1, A2, A3 may be obtained according to the Heron's formula of Eq. (1) below. In Eq. (1), the area A1 is calculated by way of example.

$$A1 = SQRT(S \times (S-L2) \times (S-L6) \times (S-L5)) \quad (1)$$

where, $S = (L2+L6+L5)/2$

The attribute V4 of the attribute calculation point P4 may be calculated according to Eq. (2) below. This equation Eq. (2) is an interpolation formula using the area ratios. Eq. (3) is an example of calculation in which specific numeral values are substituted into Eq. (2). FIG. 8 shows one example of specific numeral values of the attributes of the nodes P1, P2, P3 and the attribute calculation point P4, and the lengths of the respective segments L1-L6.

$$V4 = V1 \times (A1/A) + V2 \times (A2/A) + V3 \times (A3/A) \quad (2)$$

$$V4 = 0.0 \times (5.33/13.09) + 6.16 \times (3.58/13.09) + 4.25 \times (4.18/13.09) = 3.04 \quad (3)$$

Similarly, the attribute calculating means 14 calculates the attributes V4 (t1), V4 (t2) of all of the attribute calculation points t1, t2 (represented by the attribute calculation point P4) in the triangular element 31, with respect to each of the first and second shapes 21, 22.

The attribute difference calculating means 15 calculates a difference Vs (Vs=Va−Vb) between the attribute Va of each attribute calculation point P4, or each attribute calculation point t1, of the first shape 21 and the attribute Vb of each attribute calculation point t2 of the second shape 22.

The attribute difference displaying means 16 displays only one of the first shape 21 and the second shape 22, or displays the first shape 21 and the second shape 22 that are superimposed on each other, and displays the attribute differences Vs on the displayed shape(s).

Figure 9:
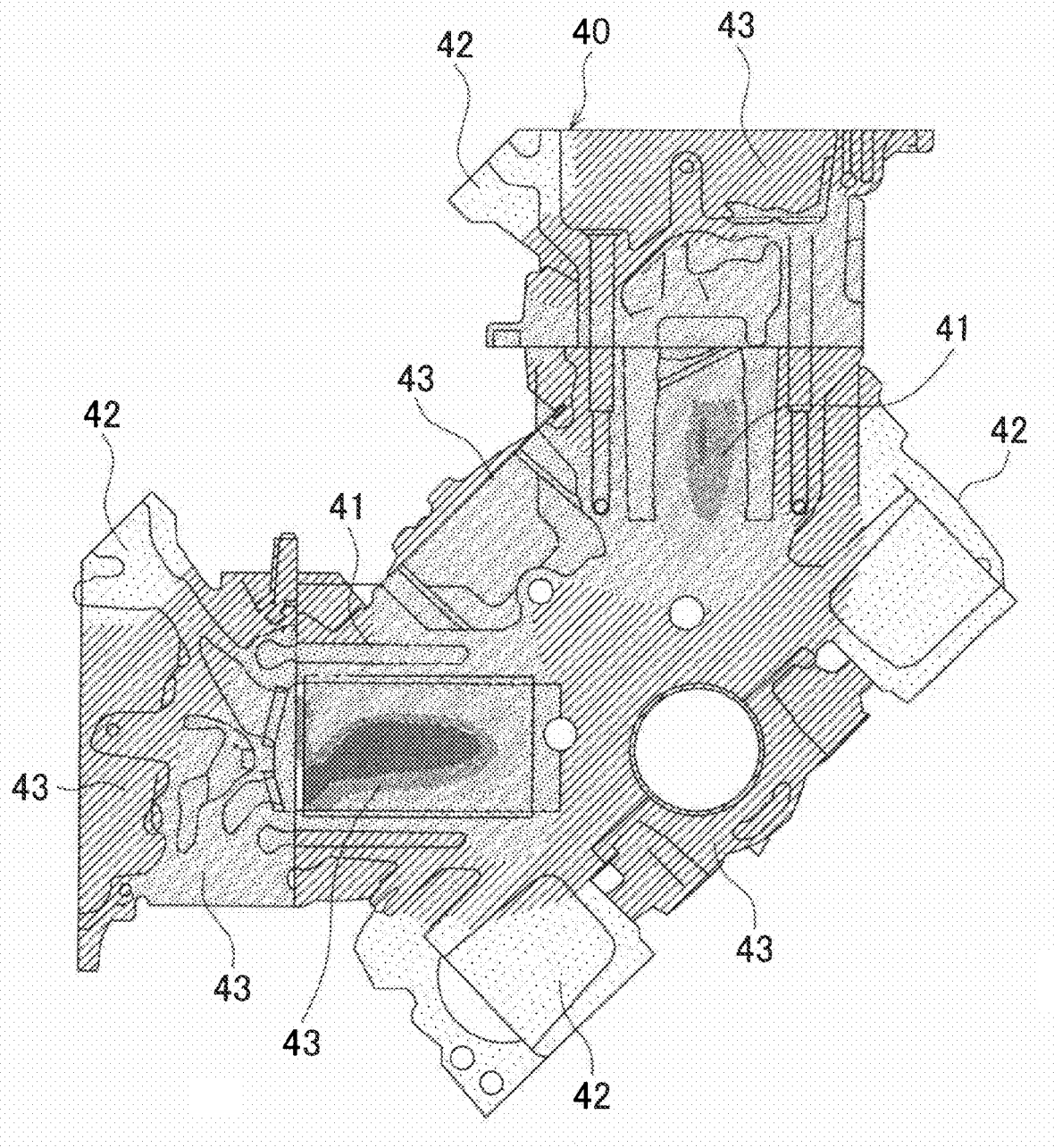
FIG. 9 is a view useful for explaining a method of displaying differences in the attribute of an engine part on the screen, according to the embodiment of the invention.

FIG. 9 shows, as one example, differences Vs between the surface temperature of an engine part 40 before its shape is altered, and the surface temperature of the engine part 40 after its shape is altered, when displayed on the shape representing the engine part 40 before shape alteration. In this example, the engine part 40 is divided into a plurality of regions displayed in different colors that differ depending on the difference Vs. More specifically, regions 41 having the largest difference value of the surface temperature are displayed in a dark red color, and regions 42 having the smallest difference value of the surface temperature are displayed in a dark blue color, while regions 43 having intermediate difference values of the surface temperature are displayed in a selected one of a light red color, light green color, dark green color and a light blue color, with the selected color changing in this order as the difference value decreases. Thus, the respective regions are displayed in different colors depending on the difference value, so that the condition of the distribution of the differences in the attribute can be recognized at a glance. The differences in the attribute may also be displayed while being discriminated by isopleths, a graph, graphics, or the like.

The function of each means 11-18 is implemented by a computer program executed by a computer, as one function of a CAE (Computer Aided Engineering) system incorporated in the computer. The computer includes CPU (Central Processing Unit), memory, input/output interface, external storage connected to the input/output interface, display device connected to the input/output interface, input device connected to the input/output interface, communication device connected to the input/output interface, and so forth.

The external storage is in the form of, for example, a hard disk drive. The external storage may also be in the form of a drive for a removable storage medium, for example, a drive for CD-ROM (Compact Disc Read Only Memory), DVD (Digital Versatile Disk), or the like. As another example of the external storage, an input/output device of a flash memory card may be used.

The display device may be in the form of, for example, a CRT (Cathode Ray Tube), a liquid crystal display, or the like. The input device may be in the form of, for example, a keyboard, a pointing device, or the like. The pointing device may be selected from, for example, a mouse, a joystick, a touch tablet or touchpad, a flat, electrostatic pointing device, a pointing device shaped like a stick, and others. The communication device may be, for example, a LAN board.

Figure 10:
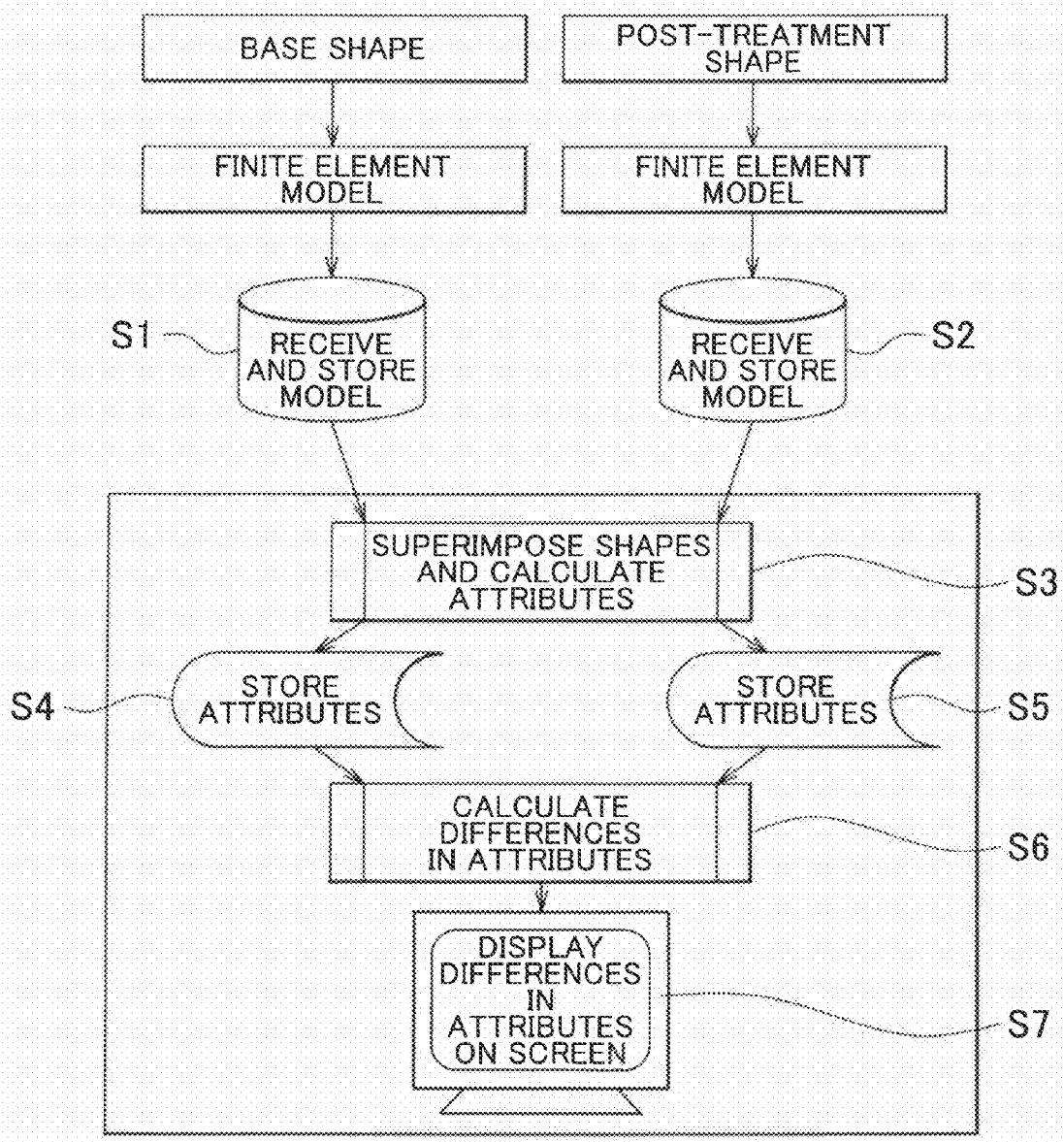
FIG. 10 is a flowchart showing a control flow according to the embodiment of the invention.

FIG. 10 is a flowchart showing the control flow of the present invention. Referring to FIG. 10, an example of calculation of differences between the attributes of a base shape (the first shape) and the attributes of a post-treatment shape obtained by subjecting the base shape to a certain treatment will be explained.

Before the control flow starts, a finite element model is created with respect to each of the base shape and the post-treatment shape. Initially, the input means 11 receives data indicative of the base shape and data indicative of its finite element model, and data indicative of the post-treatment shape and data indicative of its finite element model, and the storage means 17 stores these items of data (S1, S2).

Subsequently, the shape display means 12 displays the base shape and the post-treatment shape on the screen, and the superimposing means 13 superimposes the base shape and post-treatment shape displayed on the screen, on each other, based on the reference site(s) (S3). Then, the attribute calculating means 14 calculates the attributes of the attribute calculation points, based on the attributes of the nodes, with respect to each of the base shape and the post-treatment shape, and the storage means 17 stores the attributes of the nodes and attribute calculation points of the base shape and post-treatment shape, in a memory for screen display (S4, S5).

Subsequently, the attribute difference calculating means 15 calculates differences between the attributes of the nodes and attribute calculation points of the base shape and those of the post-treatment shape stored in the memory for screen display (S6). Then, the attribute difference display means 16 displays, for example, the base shape, and displays the calculated differences in the attributes of the nodes and attribute calculation points, on the base shape (S7).

Thus, the design support system 1 of the invention calculates the differences Vs in the attributes Va, Vb at the nodes P1-P3 of the finite element models and the attribute calculation points t1, t2 other than the nodes P1-P3, between at least two, mutually different shapes 21, 22, and displays the differences Vs on the screen while distinguishing the differences from one another depending on the difference values. Accordingly, the condition of the distribution of the differences in the attribute can be easily recognized.

In the illustrated embodiment, the attributes Va, Vb of the attribute calculation points t1, t2 other than the nodes P1-P3 are calculated by interpolation, based on the attributes of the nodes P1-1P3. However, the attributes Va, Vb of the attribute calculation points t1, t2 may be calculated by any other known technique, for example, by finding equivalent points.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A design support system comprising:
an input portion that receives shape data indicative of at least two, mutually different shapes, finite element model data indicative of a finite element model for each of said at least two shapes, and attribute data indicative of an attribute at each node of the finite element model;
a shape display portion that displays said at least two shapes on a screen;
a superimposing portion that superimposes said at least two shapes displayed on the screen by the shape display portion, on each other, with reference to a site designated by information received by the superimposing portion, or a predetermined site;
an attribute calculating portion that calculates the attribute at an attribute calculation point set at a predetermined position on the screen, based on the attribute of said each node, with respect to each of said at least two shapes superimposed on each other; and
an attribute difference calculating portion that calculates differences in the attribute between said at least two shapes, at the nodes and the attribute calculation points, wherein the attribute calculation points are separate from the nodes of the finite element model.

2. The design support system according to claim 1, wherein said at least two shapes are in two-dimensional form.

3. The design support system according to claim 1, wherein:
the screen of the shape display portion comprises a plurality of pixels; and
the nodes and the attribute calculation points are located at positions corresponding to the pixels.

4. The design support system according to claim 1, further comprising an attribute difference displaying portion for displaying the differences in the attribute at the nodes and the attribute calculation points.

5. The design support system according to claim 4, wherein the attribute difference display portion displays the differences in the attribute, using isopleths, a graph, or graphics.

6. The design support system according to claim 1, wherein the attribute difference calculating portion calculates the differences in the attribute, by interpolation or finding of equivalent points.

7. The design support system according to claim 1, wherein the attribute calculating portion calculates the attribute at the attribute calculation point by interpolating attributes of the nodes which define an element in which the attribute calculation point is provided.

8. A design support method comprising the steps of:
receiving shape data indicative of at least two, mutually different shapes, finite element model data indicative of a finite element model for each of said at least two shapes, and attribute data indicative of an attribute at each node of the finite element model;
displaying said at least two shapes on a screen;
superimposing said at least two shapes displayed on the screen, on each other, with reference to a site designated by information received, or a predetermined site;
calculating the attribute at an attribute calculation point set at a predetermined position on the screen, based on the attribute of said each node, with respect to each of said at least two shapes superimposed on each other; and
calculating differences in the attribute between said at least two shapes, at the nodes and the attribute calculation points,
wherein the attribute calculation points are separate from the nodes of the finite element model.

9. The design support method according to claim 8, wherein said at least two shapes are in two-dimensional form.

10. The design support method according to claim 8, wherein:
the screen comprises a plurality of pixels; and
the nodes and the attribute calculation points are located at positions corresponding to the pixels.

11. The design support method according to claim 8, further comprising a step of displaying the differences in the attribute at the nodes and the attribute calculation points.

12. The design support method according to claim 11, wherein the step of displaying the differences in the attribute comprises displaying the differences in the attribute, using isopleths, a graph, or graphics.

13. The design support method according to claim 8, wherein the step of calculating the differences in the attribute comprises calculating the differences in the attribute by interpolation or finding of equivalent points.

14. A design support program product stored in a non-transitory computer readable medium, the design support program comprising:
a step to be executed by a computer, of receiving shape data indicative of at least two, mutually different shapes, finite element model data indicative of a finite element model for each of said at least two shapes, and attribute data indicative of an attribute at each node of the finite element model;
a step to be executed by the computer, of displaying said at least two shapes on a screen;
a step to be executed by the computer, of superimposing said at least two shapes displayed on the screen, on each other, with reference to a site designated by information received, or a predetermined site;
a step to be executed by the computer, of calculating the attribute at an attribute calculation point set at a predetermined position on the screen, based on the attribute of said each node, with respect to each of said at least two shapes superimposed on each other; and
a step to be executed by the computer, of calculating differences in the attribute between said at least two shapes, at the nodes and the attribute calculation points,
wherein the attribute calculation points are separate from the nodes of the finite element model.

15. The design support program product according to claim 14, wherein said at least two shapes are in two-dimensional form.

16. The design support program product according to claim 14, wherein:
the screen comprises a plurality of pixels; and
the nodes and the attribute calculation points are located at positions corresponding to the pixels.

17. The design support program product according to claim 14, wherein the design support program further comprises a step of displaying the differences in the attribute at the nodes and the attribute calculation points.

18. The design support program product according to claim 17, wherein the step of displaying the differences in the attribute comprises displaying the differences in the attribute, using isopleths, a graph, or graphics.

19. The design support program product according to claim 14, wherein the step of calculating the differences in the attribute comprises calculating the differences in the attribute by interpolation or finding of equivalent points.

* * * * *

UNITED STATES PATENT AND TRADEMARK OFFICE
CERTIFICATE OF CORRECTION

| | |
|---|---|
| PATENT NO. | : 8,274,528 B2 |
| APPLICATION NO. | : 12/167484 |
| DATED | : September 25, 2012 |
| INVENTOR(S) | : Ryusaka Sawada |

It is certified that error appears in the above-identified patent and that said Letters Patent is hereby corrected as shown below:

On the title page, Item (54), and column 1, the title is incorrect. Item (54) and column 1, should read:

-- DESIGN SUPPORT SYSTEM, METHOD AND PROGRAM --

Signed and Sealed this
Fifteenth Day of January, 2013

David J. Kappos
*Director of the United States Patent and Trademark Office*